Patented Feb. 17, 1953

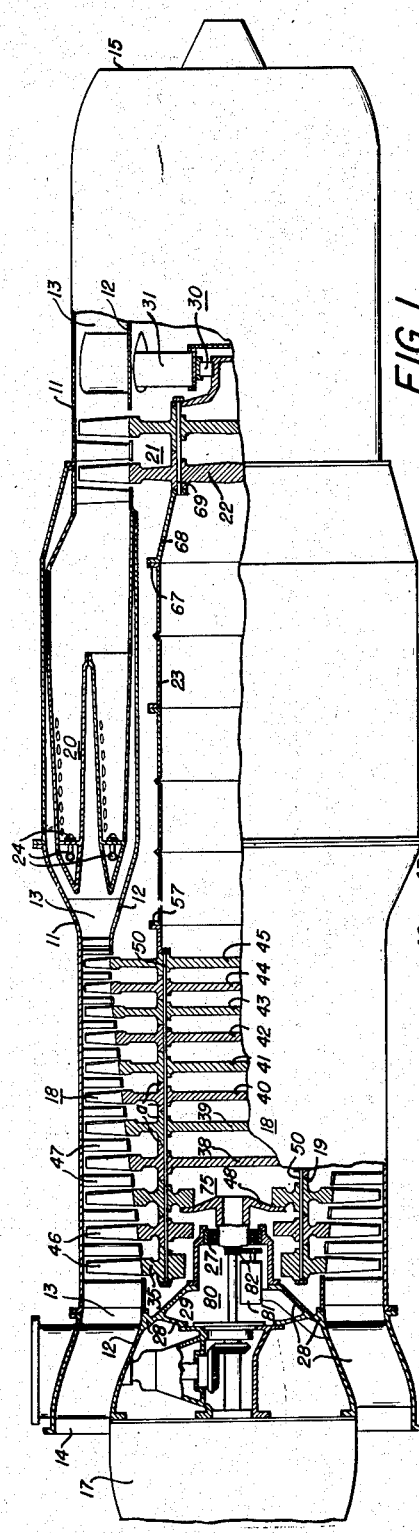

2,628,766

UNITED STATES PATENT OFFICE 2,628,766

GAS TURBINE POWER PLANT

Josef A. Rydmark, Lansdowne, and Haakon O. Pedersen, Philadelphia, Pa., assignors, by mesne assignments, to the United States of America as represented by the Secretary of the Navy Application November 26, 1948, Serial No. 61,973

6 Claims. (Cl. 230—116)

This invention relates to elastic fluid machines, such as gas turbine power plants, and has for an object the provision of improved apparatus of the class described.

It is a more specific object of the invention to provide an improved aviation gas turbine power plant having novel features of construction particularly useful in apparatus of large size and high thrust rating, and permitting the maintenance of the over-all length of the plant within desirable limits. It is also an object to provide an improved construction and arrangement of elements facilitating the manufacture, assembly and repair of gas turbine apparatus of this type.

Another object of the invention is the provision of an improved gas turbine power plant having a spindle aggregate including a compressor rotor, shaft and turbine rotor supported on a pair of bearings in such a manner as to minimize deflection of the spindle aggregate when subjected to gyroscopic and gravitational loading.

A further object of the invention is the provision of a power plant having a spindle aggregate constructed and arranged to resist deflection to a degree permitting the efficient use of small clearance between the rotating and stationary parts, favoring economical operation of the apparatus.

An important feature of the invention is the provision of a rotor aggregate supported on a pair of bearings and comprising a plurality of discs or annular members bolted in coaxial relation by means of a number of longitudinally arranged studs, the discs adjacent one end having openings forming a chamber which is adapted to receive one of the bearings, so that the span of the rotor aggregate between the two bearings will be less than its total length for minimizing deflection under gyroscopic and gravitational loading.

These and other objects are effected by the invention as will be apparent from the following description and claims taken in connection with the accompanying drawing, forming a part of this application, in which:

Fig. 1 is a diagrammatic elevational view, partly in section, of an improved gas turbine power plant having a rotor constructed in accordance with the invention; and Fig. 2 is a fragmentary sectional view, in enlarged detail, of a portion of the rotor of the compressor shown in Fig. 1.

The present invention may be employed in the construction of either a turbojet or a turboprop engine, the apparatus illustrated in Fig. 1 being of the turbojet type and comprising a cylindrical outer casing structure 11 having mounted therein a sectional core structure 12 for defining an annular fluid flow passageway 13, which extends axially through the power plant from an annular air inlet opening 14 to a rearwardly disposed discharge nozzle 15. The elements of the power plant are arranged in alignment with the axis thereof, thus minimizing the frontal area and drag incident to forward motion of the aircraft (not shown) which will carry the turbojet with the inlet opening pointed in the direction of flight. The main elements of the engine include a cowl or fairing 17, housing auxiliary control and starting equipment (not shown), an axial-flow compressor 18 having a rotor assembly 19, annular combustion apparatus 20, and a turbine 21 having a rotor assembly 22 which is operatively connected to the compressor rotor through the medium of a tubular shaft 23 disposed interiorly of the combustion apparatus. Associated with the combustion apparatus 20 are a plurality of annular fuel manifolds and nozzles 24, which are supported on suitable radial struts (not shown) through which the usual fuel supply lines are adapted to extend.

According to the invention, as hereinafter more fully described, the compressor rotor assembly 19, shaft 23 and turbine rotor assembly 22 constitute a spindle aggregate that is journaled on two bearings, consisting of a forwardly disposed thrust bearing 27 supported by means of a load carrying structure and struts 28 disposed in advance of the compressor, and a rear bearing 30 supported by radial struts 31 which are disposed downstream with respect to the turbine 21.

The general principles of operation of such a gas turbine power plant are well known. Air entering the air inlet opening 14 is compressed by the compressor 18 and conducted through the annular passage 13 to the combustion apparatus 20, where fuel supplied by way of nozzles 24 is burned to create the necessary motive fluid, which is expanded through the turbine 21 and finally discharged by way of the nozzle 15, for establishing a propulsive thrust.

According to the invention, the rotor assembly 19 of the compressor 18 comprises a plurality of discs, designated by the reference characters 35 to 45, inclusive, which may constitute successive stages of the compressor. Each of the discs is provided with a plurality of radially disposed blades, designated generally by the reference character 46. Arranged in cooperative relation with the rotary blades carried by the turbine rotor 19 are a plurality of annular diaphragms carrying radial stationary blades, such as those indicated by the reference character 47 in Fig. 2, it being understood that any suitable means for mounting the diaphragms in the casing structure 11 may be provided.

The discs of the compressor rotor 19 are assembled in coaxial relation, each of the sides of each disc having formed thereon a concentric annular clutch portion $a$ on which radially disposed teeth are formed, the clutch portions $a$ of adjacent discs being thus adapted to be interlocked together, as shown in Fig. 2. The annular clutch portions $a$ and the teeth formed thereon are elevated or projected from the side faces of the respective compressor discs, so that the main portions of adjacent faces of the discs are separated from each other inwardly and outwardly of the engaging clutch portions. In the form of the apparatus illustrated in the drawing, the rearwardly disposed compressor discs including the discs 38 to 45 have solid central portions, while the forwardly disposed discs or annular members 35, 36 and 37 are provided with somewhat enlarged inner web portions surrounding central apertures $35a$, $36a$ and $37a$, respectively. For supporting the compressor rotor 19 on the frontal thrust bearing assembly 27, as hereinafter more fully explained, the disc or annular members 37 is secured to a suitably flanged journal member 48 by means of bolts 49 (see Fig. 2).

The interlocking compressor discs are held in assembled relation by means of a plurality of longitudinally disposed stay rods or studs 50 which are mounted in suitable registering bores formed in the respective discs, the bores being angularly spaced about and equidistant from the axis of the rotor assembly.

The tubular shaft 23, as shown in Fig. 1, has a diameter sufficient to withstand bending stresses imposed on the spindle aggregate during rotation, and in the present embodiment of the invention is of a diameter substantially equal to that of the annulus of the interlocked teeth of the clutch portions $a$ on the compressor discs. The tubular shaft 23 may be formed by joining a plurality of cylindrical sections having annular flanges that are secured together by bolts or other suitable means (not shown). A forwardly disposed flange 57 of the shaft 23 is secured to a bolting face of an annular member on the end disc 45 of the compressor rotor structure. A rearwardly disposed annular flange 67 is likewise provided for securing the shaft 23 to the end of a frusto-conical drum 68, which has an annular flange suitably bolted by bolts 69 to the rotor 22 of the turbine 21.

According to the invention, the forwardly disposed discs of the compressor rotor have formed therein central apertures, which, with the discs assembled together, constitute an axially disposed chamber within the rotor of sufficient size to receive the thrust bearing 27, so that the span of the spindle aggregate between the two supporting bearings is substantially less than the over-all spindle length.

Referring to Fig. 2, in the preferred form of compressor rotor structure illustrated, the discs or annular members 35, 36 and 37 having the respective apertures $35a$, $36a$ and $37a$ are adapted to form a frontal chamber, indicated generally at 75, which extends axially to the first of the group of discs 38—40 having solid central webs. The journal member 48, carried by the inner web portion of the member 37 which defines the aperture $37a$, includes a forwardly extending axial portion 76 which is rotatable in suitable ball bearings forming parts of the thrust bearing assembly 27 already mentioned. The bearing assembly 27 further comprises a tubular bracket or housing 77 having an annular flange 78 which is bolted or otherwise secured to an inwardly canted flange 79 of the engine core structure 12.

Formed interiorly of the housing 77 and flange 79 is a chamber 80, within which a lubricant pump 81 or other auxiliary device may be mounted, and operatively connected to a toothed portion 82 of the journal member 48 through the medium of a gear 83. It will be noted that with the apparatus constructed and arranged as shown in Fig. 2, the thrust bearing assembly 27 is substantially contained within the axial chamber 75 formed in the rotor of the compressor 18, so that the span of the spindle aggregate between the two bearings 27 and 30 is less than the overall length thereof. This construction, making practicable a substantial decrease in the length of the span and load deflection of the spindle aggregate between bearings, will in effect raise the critical speed of the power plant, and preserve better compressor seal clearances, particularly near the last stages.

From the foregoing description of a typical gas turbine power plant constructed in accordance with the invention, it will now be apparent that the improved spindle aggregate, comprising the compressor rotor, large diameter hollow shaft and turbine rotor in the order named, is well adapted for support on fore and aft bearings without the requirement of a conventional intermediate bearing, thereby dispensing with elements and structure which would otherwise add weight to the apparatus. By mounting the described spindle aggregate on a pair of bearings so spaced that the span between the bearings is less than the over-all length of the spindle aggregate, the deflection of the spindle aggregate, under gyroscopic and gravitational loading incident to high speed operation, will be reduced to a minimum, thus rendering feasible the use of efficiently small clearances between the rotary and stationary blades of the machine. In addition, the provision of the central chamber in the compressor rotor for receiving the adjacent bearing facilitates construction of an engine of desirable dimensions without sacrifice in power or thrust rating.

What is claimed is:

1. In elastic fluid rotary apparatus including casing structure, a pair of spaced bearings supported in said casing structure, and a spindle aggregate mounted substantially between and journaled on said bearings, said spindle aggregate including a rotor assembly having a plurality of annular members carrying radially extending blades and joined in coaxial relation, the annular members adjacent one end of said spindle aggregate having central openings forming an axially disposed chamber receiving one of said bearings, a tubular bracket secured to said casing structure outwardly of said rotor assembly and projecting into said chamber holding the last-mentioned bearing therein, and a spindle member rotatably mounted in the latter bearing and secured to the innermost of said annular members having central openings, whereby said rotor assembly is constructed and arranged to overhang said last-mentioned bearing to limit the necessary spacing thereof from the other bearing to a distance less than the full length of the spindle aggregate.

2. In a gas turbine power plant including cylindrical casing structure having a fluid inlet end and a fluid discharge end, a spindle aggregate rotatably mounted longitudinally within said casing structure and comprising a compressor rotor disposed near said inlet end and a turbine rotor disposed near said outlet end, a pair of spaced bearing assemblies constituting the sole support of said spindle aggregate in said casing structure, one of said bearing assemblies being mounted adjacent the downstream side of said turbine rotor, said compressor rotor comprising a number of abutting annular members having central openings forming an axially disposed chamber open at the upstream side thereof, a journal member secured to one of said apertured members within said chamber, and a bracket mounted in said casing structure supporting the other of said two bearing assemblies within said chamber and in cooperative relation with said journal member, whereby said spindle aggregate is constructed and arranged to overhang the last-mentioned bearing assembly for minimizing the span between points of support for said spindle aggregate.

3. In elastic fluid rotary apparatus including casing structure, a pair of spaced bearings supported in said casing structure, and a spindle aggregate mounted substantially between and journaled on said bearings, said spindle aggregate including a rotor assembly having a plurality of annular members carrying radially extending blades and joined in coaxial relation, the annular members adjacent one end of said rotor assembly having central openings forming an axially disposed chamber receiving one of said bearings, a tubular bracket secured to said casing structure outwardly of said rotor assembly and projecting into said chamber holding the last-mentioned bearing therein, and a lubricant pump mounted at least partially within said chamber and operatively connected to said rotor assembly.

4. In a gas turbine power plant including cylindrical casing structure having a fluid inlet end and a fluid discharge end, a spindle aggregate rotatably mounted longitudinally within said casing structure and comprising a compressor rotor disposed near said inlet end and a turbine rotor disposed near said outlet end, a pair of spaced bearing assemblies constituting the sole support of said spindle aggregate in said casing structure, one of said bearing assemblies being mounted adjacent the downstream side of said turbine rotor, said compressor rotor comprising a plurality of interlocked annular members and longitudinally disposed studs securing said members together at points radially spaced from the common axis thereof, a number of adjacent annular members having central apertures forming a chamber open at the end of said compressor rotor, a bracket mounted in said casing structure and projecting into said chamber supporting the other of said bearing assemblies, and a journal member disposed within said chamber and secured radially inwardly of said studs to one of said apertured annular members, said journal member being rotatably mounted in the last-mentioned bearing, the span of said spindle aggregate between said two bearings being less than the overall length thereof for minimizing deflection under gyroscopic and gravitational loading.

5. The combination of claim 4 further defined in that the interlocked annular members having teeth projecting axially of said annular members to prevent relative turning between the annular members during operation and that the longitudinally disposed studs securely hold the teeth of next adjacent annular members in engagement against axial displacement.

6. The combination of claim 4, and the confronting ends of the compressor rotor and turbine rotor being sustained solely by a bearingless hollow shaft rigidly secured to the said ends of the rotors.

JOSEF A. RYDMARK.
HAAKON O. PEDERSEN.

REFERENCES CITED

The following references are of record in the file of this patent:

UNITED STATES PATENTS

| Number | Name | Date |
|---|---|---|
| 2,418,801 | Baumann | Apr. 8, 1947 |
| 2,441,135 | Chalupa | May 11, 1948 |
| 2,451,944 | Hall | Oct. 19, 1948 |
| 2,461,402 | Whitehead | Feb. 8, 1949 |
| 2,461,931 | Smith et al. | Feb. 15, 1949 |
| 2,528,635 | Bell | Nov. 7, 1950 |